C. F. JENKINS.
MOTION PICTURE MACHINE.
APPLICATION FILED JULY 17, 1918.

1,281,970. Patented Oct. 15, 1918.

Witness
Edwin L. Bradford

Inventor
Charles Francis Jenkins
By
Attorneys

UNITED STATES PATENT OFFICE.

CHARLES FRANCIS JENKINS, OF WASHINGTON, DISTRICT OF COLUMBIA, ASSIGNOR TO THE GRAPHOSCOPE COMPANY, OF WASHINGTON, DISTRICT OF COLUMBIA, A CORPORATION OF DELAWARE.

MOTION-PICTURE MACHINE.

1,281,970.      Specification of Letters Patent.      Patented Oct. 15, 1918.

Application filed July 17, 1918. Serial No. 245,419.

*To all whom it may concern:*

Be it known that I, CHARLES FRANCIS JENKINS, a citizen of the United States, and resident of Washington, in the District of Columbia, have invented certain new and useful Improvements in Motion-Picture Machines, of which the following is a specification, reference being had therein to the accompanying drawing.

One of the most important points in motion picture work is to avoid danger from fire, especially when the machines are to be used by children, or other unskilled persons, in schools or elsewhere. It is desirable to use all means that may be readily employed, even where one of several expedients used in conjunction might probably be effective if used alone.

Such machines commonly involve a casing containing means for feeding film past an exposure opening where a light beam enters and passes at once through a film which is fed step by step, the light passing on across the interior of the casing and by giving up heat raising the temperature of the air and of the film which is passing therein to the exposure opening and onward to a storage space. This invention provides for preventing such increase of temperature by deflecting the light beam out of the casing immediately atfer it passes through the film, or almost instantly after it enters the chamber.

Figure 1:
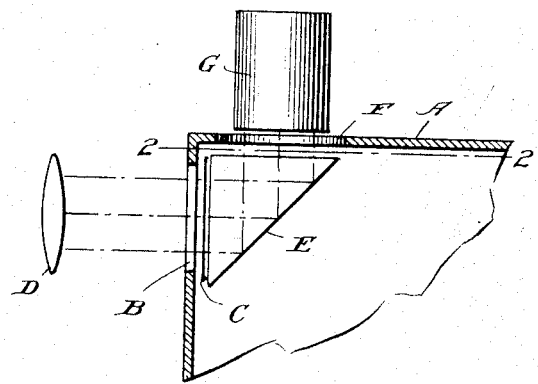
Figure 2:
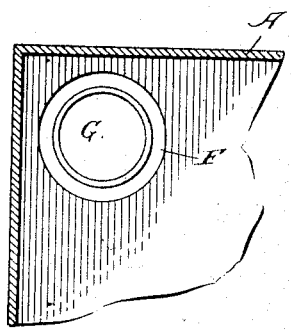

In the accompanying drawings,

Figure 1 represents a horizontal section of a portion of a casing provided with my devices, and Fig. 2 is a section on the line 2—2, Fig. 1, the figures being largely diagrammatic.

In these figures, A represents a casing having an exposure opening B across which film C is fed by any suitable means. Light from any ordinary source enters the opening through which it is directed by a condensing lens D and at once passes through the film to a prism E which deflects out of the casing through a large opening F where a projecting lens G receives it and directs it to the proper part of a screen, not shown.

The opening F is so large that the little air through which the light passes in going from the prism to the casing wall is practically open air which would rise if heated and pass obliquely out of the chamber. The beam thus passes through but one corner of the chamber, its path therein being but a small fraction of the ordinary path and the heat given up being a correspondingly small fraction of that usually retained in the casing, and consequently the film when it reaches the exposure opening has a low temperature and is far less likely to ignite.

What I claim is:

1. The combination with a casing provided with an exposure opening across which motion picture film is fed, of means for throwing a beam of light through said opening and the film thereat, and means for deflecting the beam sharply as soon as it has passed the film and allowing it to pass out of the casing.

2. The combination with a casing provided with an exposure opening for film to be fed past the opening by devices within the casing, of means for throwing a light beam through said opening and the film thereat, and a prism arranged to deflect the beam abruptly, as soon as it has passed the film, out through an opening at the side of the casing, whereby the path of the beam inside the casing is extremely short and the heating of the interior is correspondingly minimized.

In testimony whereof I hereunto affix my signature.

CHARLES FRANCIS JENKINS.